United States Patent Office 3,501,325
Patented Mar. 17, 1970

3,501,325
GELLED PHOSPHATE ESTERS
James P. Hamilton, Pasadena, Md., assignor to FMC Corporation, New York, N.Y., a corporation of Delaware
No Drawing. Filed Dec. 9, 1968, Ser. No. 782,489
Int. Cl. C09d 1/00; C09k 3/22
U.S. Cl. 106—287                             3 Claims

ABSTRACT OF THE DISCLOSURE

This application discloses triorganic phosphate coating compositions suitable for coating dust filter media in air filters in which the triorganic phosphate is thickened by pyrogenic silica or a combination of pyrogenic silica and a chemically modified magnesium silicate, and about 0.01 to 0.08% by weight of an amine, based on the total mixture of triorganic phosphate and the particulate gelling agent.

BACKGROUND OF THE INVENTION

Field of the invention

This invention relates to novel, bodied, thixotropic triorganic phosphate gel compositions suitable for coating dust filter media in air filters.

Description of the prior art

Viscous-impingement type industrial air filters contain porous filter media, or mats, through which air is passed. The filter media is coated with a suitable non-volatile liquid which entraps dust particles as air is passed through the filter and prevents the dust particles from being re-entrained in the air stream. However, loss of this liquid coating during use results in a lowering of the air cleaning capacity of the filter. The liquid may be blown off the filter media by high air velocities, encountered for example, with diesel engine filters. Moreover, when a filter media is tightly wound around spools, such as in a recently developed automatic replacement filter, the liquid tends to be squeezed out of the filter media.

In the past these losses have been reduced by bodying the liquid which a semi-soluble resin or other gelling agent. However, these resin-liquid compositions tend to decrease in viscosity at elevated temperatures, especially at the temperatures reached with diesel engine air filters. If gelling agents, such as finely divided silica are used, as much as 5 to 7% silica, based on the mixture, is ordinarily required to satisfactorily thicken a suitable liquid such as a triorganic phosphate. This large amount of silica in the thickened liquid can clog spray nozzles and associated filters generally used in coating air filter mats. Furthermore, the mixture thickens on aging due to syneresis. Syneresis, the separation of liquid from a gel caused by contraction, reduces the ability of the coated mat to entrap dust particles. Syneresis may occur during storage causing the liquid to separate away from the gel structure. The separated triorganic phosphate will then drain out of the mat leaving a high concentration of gel solids on the surface of the mat. The overall effect is a loss in dust filtering capacity.

U.S. Patent 3,297,460 discloses triorganic phosphate coating compositions with reduced silica levels and desirable physical properties that contain 0.5 to 5% by weight of a pyrogenic silica and 0.1 to 2½% by weight of a surfactant.

My copending application, Ser. No. 671,222, filed Sept. 28, 1967, discloses triorganic phosphate coating compositions with low levels of particulate gelling agents. The coating compositions disclosed in this application contain 0.1 to 3 parts of pyrogenic silica and 0.1 to 1 parts of a modified magnesium silicatae prepared according to the method described in U.S. patent application, Ser. No. 436,304, filed Mar. 1, 1965, now abandoned in favor of S.N. 701,838, filed Jan. 31, 1968.

SUMMARY OF THE INVENTION

I have now discovered triorganic phosphate coating compositions for viscous-impingement air filters which comprise:
(a) 95 to 99 parts by weight of a triorganic phosphate
(b) 1 to 4 parts by weight of a particulate gelling agent selected from the group consisting of substantially pure pyrogenic silica and modified chrysotiles (fibrous serpentine asbestos); and
(c) and about 0.01 to about 0.08% by weight of an amine based on the total weight of the triorganic phosphate and particulate gelling agents.

One to four parts by weight of the pyrogenic silica along with an effective amount of the amine thickened triorganic phosphate to a useful viscosity. The combination of about 0.1 to 1 modified magnesium silicate and 0.1 to 2 parts of pyrogenic silica along with an amine also adequately thickened a triorganic phosphate.

Pyrogenic silica alone does not thicken the triorganic phosphate sufficiently to form satisfactory coating compositions. Surprisingly, as little as 0.005% of an amine, such as triethanol amine causes a significant increase in viscosity when used with three parts of pyrogenic silica. Generally, amine levels of about 0.01 to about 0.05% thicken triorganic phosphate containing either pyrogenic silica or the combination of pyrogenic silica and magnesium silicate enough to be useful as coatings for air filter media. These thickened compositions do not drain from the filter at room temperature and retain the useful viscosities at elevated temperatures.

Description of the invention and the preferred embodiments

Triorganic phosphates useful in accordance with this invention are those in which two of the organic radicals can be phenyl or alkylated phenyl and the third organic radical can be alkylated phenyl or an alkyl radical of one to ten carbon atoms. Then phenyl or alkylated phenyl radicals can be derived from tar acid. The term tar acid is intended to include those acids which can be extracted with dilute caustic soda from tars, such as coal tar, common wood tar, petroleum tar and lignite tar. Crude tar acid extracts usually contain phenol, ortho-cresol, meta-cresol, para-cresol and isomeric xylenols, and they can be fractionated to give various grades of these products. Triorganic phosphates of particular use in practicing this invention are termed tricresyl phosphates. The term "tricresyl phosphate" is intended to include esters made from phosphorus oxychloride and mixtures of alkyl phenols known as "cresylic acids" which may be derived from coal tar, wood tar and petroleum distillate. The triorganic phosphate may also be derived from synthetic alkyl-phenols in which the phenol may contain from one to five pendant alkyl groups each consisting of one or more carbon atoms. Suitable alkyl radicals in the alkyl diaryl phosphates include but are not limited to methyl, ethyl, propyl, isopropyl, butyl, amyl, isohexyl, and ethylhexyl and the like.

The silica that we used in preparing the high viscosity compositions of this invention is of the type known as "pyrogenic silica". This type of silica is prepared by reacting almost pure silicon tetrachloride and water in a vapor phase to produce silicon dioxide and hydrogen chloride. The silica so produced is a very pure powder, of the order of 99% pure having a particle size not greater than about 0.025 microns, is presently available and useful in practicing this invention. Preferably the pyrogenic silica has a particle size of about 0.015 to 0.020 microns.

Modified chrysotiles (fibrous serpentine asbestos) are useful gelling agents for practicing this invention. Useful modified chrysotiles are produced by treating chrysotiles with an acidic media so as to increase the weight ratio of $SiO_2$ to MgO by from about 5% to about 30%. The acidic treatment weakens the fibrils of the chrysotile by etching their surface so that they can be readily reduced in size by mechanical disintegration. The acid medium can consist of essentially any acid or acid salt. The acid may be weak or strong and the treatment may be conducted at any desired temperature. The best results are obtained by treatment at elevated temperatures, preferably at the reflux temperature of the particular treating solution selected. Generally the process employs a low solids aqueous suspension of the chrysotile. For example, 0.2 normal hydrochloric acid can be used to treat chrysotile at about 5–10% solids for ½ to 4 hours at reflux temperature. The use of a pressure digestor to permit digestion under pressure permits a reduction in the treatment time, as well as concentration of acid limited to effect the change in the $SiO_2$ to MgO ratio.

After the acid treatment, the modified chrysotile is drained, washed with water, and is then mechanically disintegrated in water or some other polar liquid, preferably by shearing action, as in a Waring Blendor, Cowles Hi-Shear mixer or the like. Mechanical disintegration or attrition is carried out so as to substantially reduce the chrysotile in size and to reduce some of the modified chrysotile to submicron or colloidal segments. A process for producing modified magnesium silicates useful in practicing this invention is described in U.S. patent application S.N. 701,838, filed Jan. 31, 1968.

We have found 0.1 to 1 part of modified magnesium silicate to give useful compositions with pyrogenic silica and an amine. Higher levels of modified magnesium silicate can be used, however, the gels are too viscous for application by conventional techniques.

Amines useful in practicing this invention include primary, secondary, and tertiary lower alkyl amines in which the alkyl groups generally contain 1 to 4 carbon atoms, corresponding lower alkyl diamines, triamines, hydroxyl amines and the like. Typical amines found useful in practicing this invention include but are not limited to triethanolamine, mono-n-butyl amine, di-n-butyl amine, diethylene triamine, hexamethylene amine, hexamethylene diamine and the like.

The particulate gelling agent and the amine levels vary somewhat with the triorganic phosphate ester used in the coating compositions of this invention. The alkyl diaryl phosphate esters require higher levels of gelling agents to obtain a given viscosity increase than do the triaryl phosphate esters. The adjustments in gelling agent levels required by the different organic phosphate esters are relatively small.

The viscosity stability characteristics of the coating compositions of this invention can be varied by varying the ratios of the gelling agents. Elevated temperature viscosity stability improves with increasing silica levels. However, to keep the viscosity in a useful temperature range, it is necessary to reduce the amine level as the silica level is increased. However, amine levels below about 0.02% result in compositions that lose viscosity stability during high shear application of the coating compositions to air filter media; for example, by spraying the compositions onto air filter mats. When coating compositions of this invention contain about 0.01 to about 0.02% by weight of an amine based on the total weight (triorganic phosphate and triorganic silica) low shear applications must be used when applying the compositions to the air filter media. When the amine levels are between 0.02% to 0.05%, the coating composition viscosity stability is such that high shear applications can be used to apply the compositions to air filter media.

The coating compositions of this invention were prepared by dispersing the gelling agents in the triorganic phosphate in a high speed laboratory blender for a short period of time, sometimes as short as 1.5 minutes. As far as is known, most methods of dispersing solids in liquids may be used in practicing this invention.

The following examples, illustrating the novel, gelled phosphate esters of this invention, are presented with no intent that the invention be limited thereto. All parts and percentages unless otherwise indicated are by weight. For comparison, the ungelled tricresyl phosphate used in the examples had a viscosity of approximately 120 centipoises at 23° C.

EXAMPLE 1

A series of gels were prepared by stirring different amounts of triethanolamine into a mixture of 98 parts by weight cresyl diphenyl phosphate containing 2 parts by weight of pyrogenic silica, for a short period of time, about 2 minutes, using a high speed mixer. A comparison example containing only pyrogenic silica and tricresyl phosphate was also run. The level of triethanolamine was varied from 0.01 to 0.06 parts by weight per 100 parts of the cresyl diphenyl phosphate-silicate mixture. The compositions of the formulations and the viscosities as determined using a Brookfield Model LVF viscosimeter with a No. 4 spindle at 6 and 60 r.p.m. are listed in Table 1.

TABLE 1.—EFFECT OF VARYING AMINE LEVEL

| | Comparison Sample A | 1 | 2 | 3 | 4 | 5 | 6 |
|---|---|---|---|---|---|---|---|
| Cresyl diphenyl phosphate | 98 | 98 | 98 | 98 | 98 | 98 | 98 |
| Pyrogenic silica (Cabosil) | 2 | 2 | 2 | 2 | 2 | 2 | 2 |
| Triethanolamine | 0 | .01 | .02 | .03 | .04 | .05 | .06 |
| Viscosity, cps. (Brookfield LVF, #4 spindle): | | | | | | | |
| 6 r.p.m. | 500 | 1,300 | 6,700 | 9,500 | 12,500 | 17,000 | 17,500 |
| 60 r.p.m. | 200 | 300 | 1,300 | 2,000 | 2,550 | 2,850 | 3,000 |

EXAMPLE 2

Example 1 was repeated using 97 parts cresyl diphenyl phosphate with 3 parts of silica in the basic mixture and the triethanolamine was varied from 0.005 through 0.02%. The samples were prepared and their viscosity measured as indicated in Example 1. The compositions of the formulations and the test data obtained are listed in Table 2. Syneresis losses on these examples were determined by placing a weighed amount of gel in an uncoated paper cup and measuring the loss after one week.

TABLE 2

|  | Comparison Sample B | 7 | 8 | 9 | 10 | 11 |
|---|---|---|---|---|---|---|
| Cresyl diphenyl phosphate | 97 | 97 | 97 | 97 | 97 | 97 |
| Silica | 3 | 3 | 3 | 3 | 3 | 3 |
| Triethanolamine | 0 | 0.005 | 0.0075 | 0.01 | 0.015 | 0.02 |
| Viscosity, cps.: | | | | | | |
| 6 r.p.m | 600 | 7,000 | 19,500 | 24,000 | 34,000 | 52,000 |
| 60 r.p.m | 200 | 1,200 | 3,000 | 3,900 | 5,800 | 8,900 |
| Syneresis loss: | | | | | | |
| percent (1 week) | | 7.4 | 6.5 | 7.4 | 9.7 | 8.9 |

EXAMPLE 3

A series of samples were prepared to show the effect of increasing the silica content while maintaining a constant level of triethanolamine. The formulations were prepared by mixing the triethanolamine, silica and cresyl diphenyl phosphate in a high speed laboratory mixer for a short period of time. The composition details and viscosity characteristics of these mixtures are found in Table 3. The viscosities were measured as described in Example 1.

TABLE 3.—EFFECT OF VARYING SILICA LEVEL

|  | 12 | 13 | 14 |
|---|---|---|---|
| Cresyl diphenyl phosphate | 98 | 97.25 | 97 |
| Silica | 2 | 2.75 | 3 |
| Triethanolamine | 0.02 | 0.02 | 0.02 |
| Viscosity (cps.) #4 spindle: | | | |
| 6 r.p.m | 6,700 | 16,500 | 52,000 |
| 60 r.p.m | 1,300 | 2,850 | 8,900 |

EXAMPLE 4

A series of samples were prepared to evaluate the effectiveness of the gellants on various triorgano phosphates. The basic composition contained 3 parts of silica with 97 parts of triorganic phosphate. Triethanolamine was tried at various levels but primarily at 0.02 parts per 100 parts of the triorgano phosphate mixture. The viscosities of various coating compositions were measured as described in Example 1. The composition details and the viscosity characteristics of the various mixtures are found in Table 4.

TABLE 4.—EFFECT OF DIFFERENT PHOSPHATE ESTERS

|  | 15 | 16 | 17 | 18 | Comparison Sample C | 19 |
|---|---|---|---|---|---|---|
| Tricresyl phosphate | 97 | | | | | |
| Cresyl diphenyl phosphate | | 97 | | | | |
| Trixylyl phosphate | | | 97 | | | |
| Cresyl-xylyl phosphate | | | | 97 | | |
| Methyl diphenyl phosphate | | | | | 97 | 97 |
| Silica (Cabosil) | 3 | 3 | 3 | 3 | 3 | 3 |
| Triethanol amine | 0.02 | 0.02 | 0.02 | 0.02 | | 0.14 |
| Viscosity (cps.) (#4 spindle): | | | | | | |
| 6 r.p.m | 45,000 | 52,000 | 61,500 | 61,000 | 400 | 25,000 |
| 60 r.p.m | 71,100 | 8,900 | 8,150 | 7,650 | 140 | 5,050 |

|  | 20 | 21 | Comparison Samples D | Comparison Samples E | 22 | 23 |
|---|---|---|---|---|---|---|
| Tricresyl phosphate | 72.75 | | | | | |
| Cresyl diphenyl phosphate | | 72.75 | | | | |
| Methyl diphenyl phosphate | 24.25 | 24.25 | | | | |
| Trioctyl phosphate | | | 97 | 97 | | |
| Octyl diphenyl phosphate | | | | | 97 | 97 |
| Cabosil | 3 | 3 | 3 | 3 | 3 | 3 |
| Triethanolamine | 0.08 | 0.03 | 0.02 | 2.6 | 0.02 | 0.08 |
| Viscosity (cps.) (#4 spindle): | | | | | | |
| 6 r.p.m | 68,000 | 19,500 | 500 | 4,500 | 500 | 21,500 |
| 60 r.p.m | >10,000 | 3,500 | 150 | 1,000 | 200 | 4,160 |

|  | Comparison Sample F | 24 | 25 | 26 |
|---|---|---|---|---|
| Isodecyl-diphenyl phosphate | 97 | 97 | 97 | 97 |
| Cabosil pyrogenic silica | 3 | 3 | 3 | 3 |
| Triethanolamine | 0 | 0.02 | 0.04 | 0.06 |
| Viscosity (cps.): | | | | |
| 6 r.p.m | 500 | 2,900 | 6,900 | 12,000 |
| 60 r.p.m | 200 | 800 | 2,000 | 3,000 |

EXAMPLE 5

A series of samples were prepared to show the effect of different amines on gel compositions gelled with mixtures of the amines and silica. The formulations were prepared by mixing the gellants and cresyl diphenyl phosphate in a high speed laboratory mixer for a short period of time. The composition details and the viscosity characteristics of the various mixtures of cresyl diphenyl phosphate, pyrogenic silica and amine are found in Table 5. The viscosities of the various compositions were determined as described in Example 1.

TABLE 5.—EFFECT OF DIFFERENT AMINES

| | 27 | 28 | 29 | 30 | 31 | 32 | 33 | Comparison Sample G |
|---|---|---|---|---|---|---|---|---|
| Cresyl diphenyl phosphate | 97 | 97 | 97 | 97 | 97 | 97 | 97 | 97 |
| Silica | 3 | 3 | 3 | 3 | 3 | 3 | 3 | 3 |
| Monethanol amine | 0.02 | | | | | | | |
| Triethanol amine | | 0.02 | | | | | | |
| Mono-n-butyl amine | | | 0.02 | | | | | |
| Di-n-butyl amine | | | | 0.02 | | | | |
| Diethylene triamine | | | | | 0.02 | | | |
| Hexamethylene amine | | | | | | 0.02 | | |
| Hexamethylene diamine | | | | | | | 0.02 | |
| Aniline | | | | | | | | 0.02 |
| Viscosity (cps.) (#4 spindle): | | | | | | | | |
| 6 r.p.m. | 15,500 | 37,500 | 26,000 | 6,500 | 58,500 | 8,000 | 35,000 | 600 |
| 60 r.p.m. | 3,610 | 6,700 | 6,700 | 2,360 | 9,370 | 1,700 | 5,950 | 210 |

EXAMPLE 6

A modified magnesium silicate (chrysotile) was prepared as follows:

A Cowles tank was charged with 3,300 lbs. of water containing 43 lbs. of dissolved hydrogen chloride. Three hundred lbs. of chrysotile asbestos was added to the water in the tank and a Cowles "Hi-Shear" mixer was operated for 20 minutes to disintegrate the treated asbestos. The resulting slurry in the tank was then diluted to about 3 weight percent solids and the diluted slurry was then passed through a liquid cyclone separator (Hydroclone) to reduce the rock and magnetite content of the slurry. The slurry was then washed with water and filtered on a drum filter to remove water and dissolved magnesium chloride. The wet filter cake was dried at 100° C.

Example 1 was repeated using 100 parts of triorganic phosphate with a combination particulate gelling agent containing a pyrogenic silica and modified magnesia silicate, prepared as described above, in which triethanolamine was varied from 0 to 0.06% based on the weight of the tricresyl phosphate. The compositions of the formulations and the test data obtained are listed in Table 6. The viscosities were measured as described in Example 1.

TABLE 6

| | Comparison Sample H | 34 | 35 | 36 |
|---|---|---|---|---|
| Tricresyl phosphate | 100 | 100 | 100 | 100 |
| Pyrogenic silica (Cabosil) | 1 | 1 | 1 | 1 |
| Modified magnesium silicate | 0.5 | 0.5 | 0.5 | 0.5 |
| Triethanolamine | 0 | 0.02 | 0.04 | 0.06 |
| Viscosity (cps.): | | | | |
| 6 r.p.m. | 3,700 | 12,000 | 12,000 | 12,000 |
| 60 r.p.m. | 800 | 2,850 | 2,800 | 2,940 |

As will be apparent to those skilled in the art, numerous modifications and variations of the gelled phosphate ester compositions useful as coating compositoins for viscous impingement air filters may be made without departing from the spirit of the invention or scope of the following claims.

What is claimed is:
1. A triorganic phosphate composition for viscous impingement air filters which comprises:
  (a) 96 to 99 parts by weight of a triorganic phosphate in which two of the organic radicals can be phenyl or alkylated phenyl and the third organic radical can be alkylated phenyl or an alkyl radical of one to ten carbon atoms;
  (b) 1 to 4 parts by weight of substantially pure pyrogenic silica having a particle size not greater than 0.025 microns; and
  (c) 0.01 to 0.08% of an amine, based on the total weight of the triorganic phosphate and pyrogenic silica, selected from the group consisting of primary, secondary and tertiary lower alkyl amines and lower alkyl diamines, triamines and alkanol amines in which the alkyl groups contain 1 to 6 carbon atoms.

2. The triorganic phosphate composition of claim 1 in which the triorganic phosphate is cresyl diphenyl phosphate and the pyrogenic silica has a particle size of 0.015 to 0.020 microns.

3. The triorganic phosphate composition of claim 1 further comprising 0.1 to 1.0 parts by weight of an acid modified chrysotile.

References Cited
UNITED STATES PATENTS

| 3,133,884 | 5/1964 | Graham | 252—88 |
| 3,297,460 | 1/1967 | Rav et al. | 106—177 |
| 3,390,005 | 6/1968 | Hamilton | 106—287 |

DONALD J. ARNOLD, Primary Examiner

T. MORRIS, Assistant Examiner

U.S. Cl. X.R.

252—88

UNITED STATES PATENT OFFICE
CERTIFICATE OF CORRECTION

Patent No. 3,501,325          Dated March 17, 1970

Inventor(s) James P. Hamilton

It is certified that error appears in the above-identified patent and that said Letters Patent are hereby corrected as shown below:

Column 2, line 4, "silicatae" should read --silicate--.

Column 6, line 28, Table 4, "PHOSPHATEESTERS" should read --PHOSPHATE ESTERS--.

Column 6, Table 4, line 16 of table, "71,100" should read --7,100--.

Signed and sealed this 14th day of December 1971.

(SEAL)
Attest:

EDWARD M. FLETCHER, JR.      ROBERT GOTTSCHALK
Attesting Officer             Acting Commissioner of Patents